United States Patent [19]
Tillim

[11] Patent Number: 6,120,050
[45] Date of Patent: *Sep. 19, 2000

[54] TRAINING DEVICE FOR USE WITH A BICYCLE

[76] Inventor: Stephen L. Tillim, 2660 Solace Pl., Mountain View, Calif. 94040

[ * ] Notice: This patent issued on a continued prosecution application filed under 37 CFR 1.53(d), and is subject to the twenty year patent term provisions of 35 U.S.C. 154(a)(2).

[21] Appl. No.: 09/301,346

[22] Filed: Apr. 29, 1999

[51] Int. Cl.$^7$ .............................. B62H 1/00; A63B 69/00; G09B 9/00; G09B 19/00
[52] U.S. Cl. ........................ 280/293; 434/247; 434/258; 74/551.8
[58] Field of Search ..................... 434/247, 257, 434/258; 280/293, 288.4, 297, 298; 74/551.8

[56] References Cited

U.S. PATENT DOCUMENTS

| | | | |
|---|---|---|---|
| 4,917,398 | 4/1990 | De Miranda Pinto | 280/293 |
| 5,154,096 | 10/1992 | Geller | 74/551.8 |
| 5,306,030 | 4/1994 | Becka | 280/282 |
| 5,338,204 | 8/1994 | Herndon | 434/247 |
| 5,564,726 | 10/1996 | Hearn | 280/293 |
| 5,577,750 | 11/1996 | Sklar | 280/293 |
| 5,683,093 | 11/1997 | Hayes | 280/293 |
| 5,915,711 | 6/1999 | Seiple | 280/293 |

*Primary Examiner*—Sam Rimell
*Assistant Examiner*—Bena B. Miller
*Attorney, Agent, or Firm*—Reed Smith Hazel & Thomas LLP

[57] ABSTRACT

The invention is directed to a device for training on a bicycle. The device comprises a main support bar having at least an upright portion with first and second ends, a clamp at the first end for attaching the training device to the bicycle, and a handle grip at the second end. The handle grip is positioned upright so as to receive the thumb or radial side of the hand of an operator in an upward direction.

4 Claims, 4 Drawing Sheets

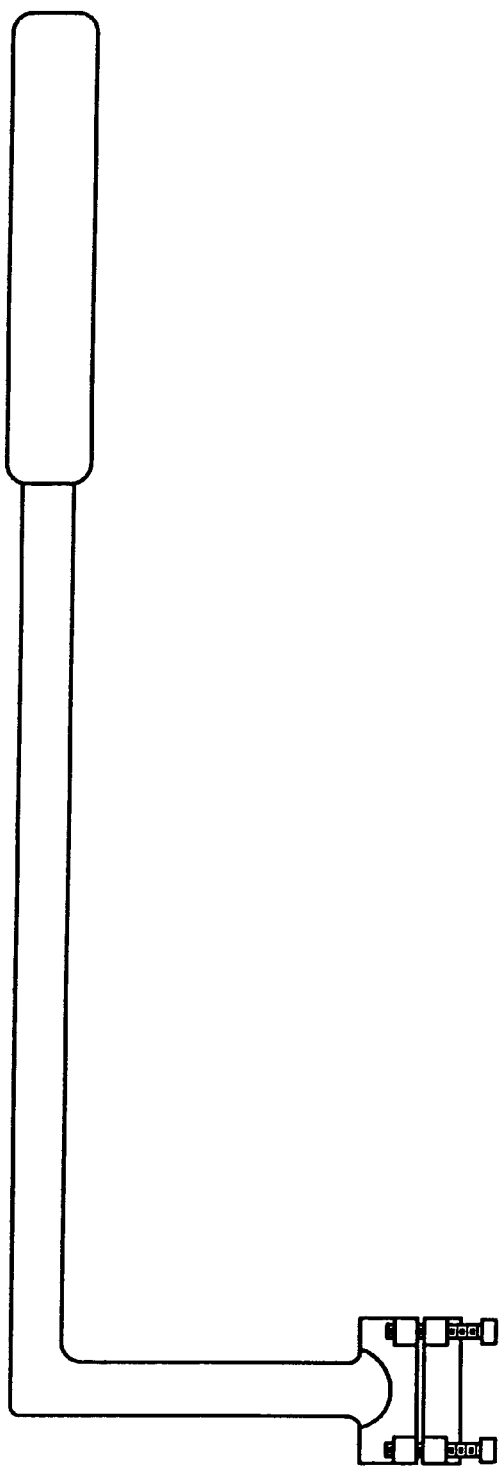 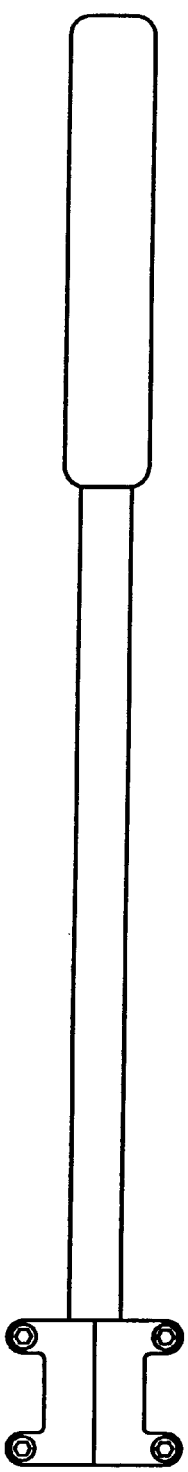
FIG. 2  FIG. 3

TRAINING DEVICE FOR USE WITH A BICYCLE

FIELD OF THE INVENTION

The present invention is directed toward an improved device for training a person to maintain balance while riding a bicycle.

BACKGROUND OF THE INVENTION

When a person desires to learn to ride a bicycle without training wheels attached thereto, it has long been the practice for a second person or trainer to support the bicycle and its rider in order to maintain the rider's balance by grasping the handlebar and/or the seat of the bicycle and walking or running along side the bicycle as the rider peddles. This, however, is extremely awkward and uncomfortable for the trainer and may be dangerous for both the rider and the trainer in the case where the trainer loses his or her control over the moving bicycle.

Accordingly, various guidance apparatus have been developed to permit a trainer to control the balance of an inexperienced rider during training. For example, U.S. Pat. No. 5,154,096 provides an apparatus comprising an elongated tubular shaft attached at one end to the seat tube and brake bridge of a bicycle frame and having a handle element mounted at the other end. The handle-bearing end extends behind and above the bicycle seat. The shaft is attached to the bicycle frame by two U-shaped bolt/bracket assemblies. However, this apparatus has the disadvantage of being connected to the bicycle at a point well below the center of gravity of the combined weight of the bicycle and rider. Therefore, the trainer must exert significant effort to maintain the bicycle and rider in an upright, balanced position as he or she struggles against natural forces of gravity when the rider tilts or loses balance completely.

Moreover, the grip in U.S. Pat. No. 5,154,096 is in a perpendicular position relative to the back of the rider, which causes the hand position of the trainer to be horizontal to the ground. It takes more effort to control balance with this hand position and to control the speed of the bicycle during training. Thus, this prior art apparatus includes a hand-brake attachment to assist in stopping the bicycle or controlling its speed.

U.S. Pat. No. 5,259,638 provides an elongated tube apparatus which is connected at one end by a clamping mechanism to the bicycle frame at the upper rear wheel fork, and which carries at the other end a handle which is perpendicular to the tube. The tube and its handle are pivotable relative to the bicycle frame in the up and down direction and in the sideways direction in order to permit the trainer to hold the bicycle upright without having to stoop during riding of the bicycle. However, this apparatus also suffers from having a point of attachment to the bicycle which is not proximate to the center of gravity of the bicycle and its rider, and it is therefore difficult to control the bicycle as the rider leans from side to side.

U.S. Pat. No. 5,303,955 provides an adjustable, two part apparatus which is attached to a bicycle either at the collar of the seat tube or to the seat itself. The first part of the apparatus is an attachment means having a receiving portion. When rider training is to ensue, the second part which is a tubular shaft is inserted into the receiving portion of the attachment means and is locked in place. If the training apparatus is to be attached directly to the seat, the seat must be provided with a suitable attachment means, such as a clip disposable through a slot formed in the seat. This adjustable, two part apparatus is comparatively sophisticated in design, which would make it more costly to produce. In addition, the apparatus does not provide any more control over the balance of the bicycle and rider than the prior apparatus discussed above. The handle extends too far behind the rider and thus requires more force to correct the balance of the bicycle and its rider.

U.S. Pat. No. 5,564,726 and U.S. Pat. No. 5,577,750 show further variations of a bicycle rider training apparatus connected to the frame of a bicycle, but do not provide any greater control than those devices predating them. For example, the training device of U.S. Pat. No. 5,564,726 places the trainer too far behind the rider and does not attach to the seat tube. It also has the disadvantage of making the trainer raise their arm too high and in an awkward position, further limiting the trainer's control of the bicycle.

The training device of U.S. Pat. No. 5,577,750 is flexible and is attached to the rear wheel fork. It has the disadvantage of being flexible and thereby potentially unstable with a tendency to overcorrect for loss of balance while a child is tilting to one side or the other. Its attachment to the rear wheel fork, away from the seat tube, also contributes to limited control by the trainer.

U.S. Pat. No. 5,683,093 provides a bicycle rider training device which is attachable to a bicycle at three points on the bicycle, namely, to each side of the rear bicycle wheel and to the bicycle frame itself. This apparatus has the disadvantages of being difficult to attach and remove and, while the multiple attachment points improve control over the prior devices, the apparatus does not solve the problem of the center of gravity of the bicycle and rider. Moreover, the position of the handle grip places the trainer's hand in an awkward non-physiologic position and forces the trainer either to hold his arm out or get closer to the bicycle where potential interference with the pedaling of the bicycle may occur.

SUMMARY OF THE INVENTION

The present invention overcomes the disadvantages of the prior art training devices by providing a single-piece, L-shaped training bar that attaches to the frame of a child's bicycle at the seat support tube as close to the underside of the bicycle seat as possible to permit better balance control by the trainer. The training bar attaches at its clamping end to the support tube via a clamping means of sufficient strength and construction to attach securely to the seat tube and to transmit good support to the bicycle. The clamping means attaches to the seat tube such that the training device is on the same side of the bicycle as the trainer. The training bar is provided with a handle grip at the control end. The handle is grasped by the trainer with the thumb or radial side of the hand held upward, and the arm position of the person training is such that the elbow is at the trainer's side and not stretched or abducted. This provides a more comfortable physiologic position and the person doing the training is able to use pectoral and grip muscles more effectively to hold and support the bicycle and its rider, as well as to control of the velocity of the bicycle without resorting to a hand-brake.

In another embodiment of the invention, the training bar is provided with a second attachment means which permits attachment of the device to the seat itself as well as to the support bar underneath the seat to increase trainer control of the bicycle.

BRIEF DESCRIPTION OF THE DRAWINGS

FIG. 2 is a side view of the training bar of the invention.

FIG. 3 is a front view of the training bar of the invention.

DETAILED DESCRIPTION OF THE PREFERRED EMBODIMENT

Figure 1:
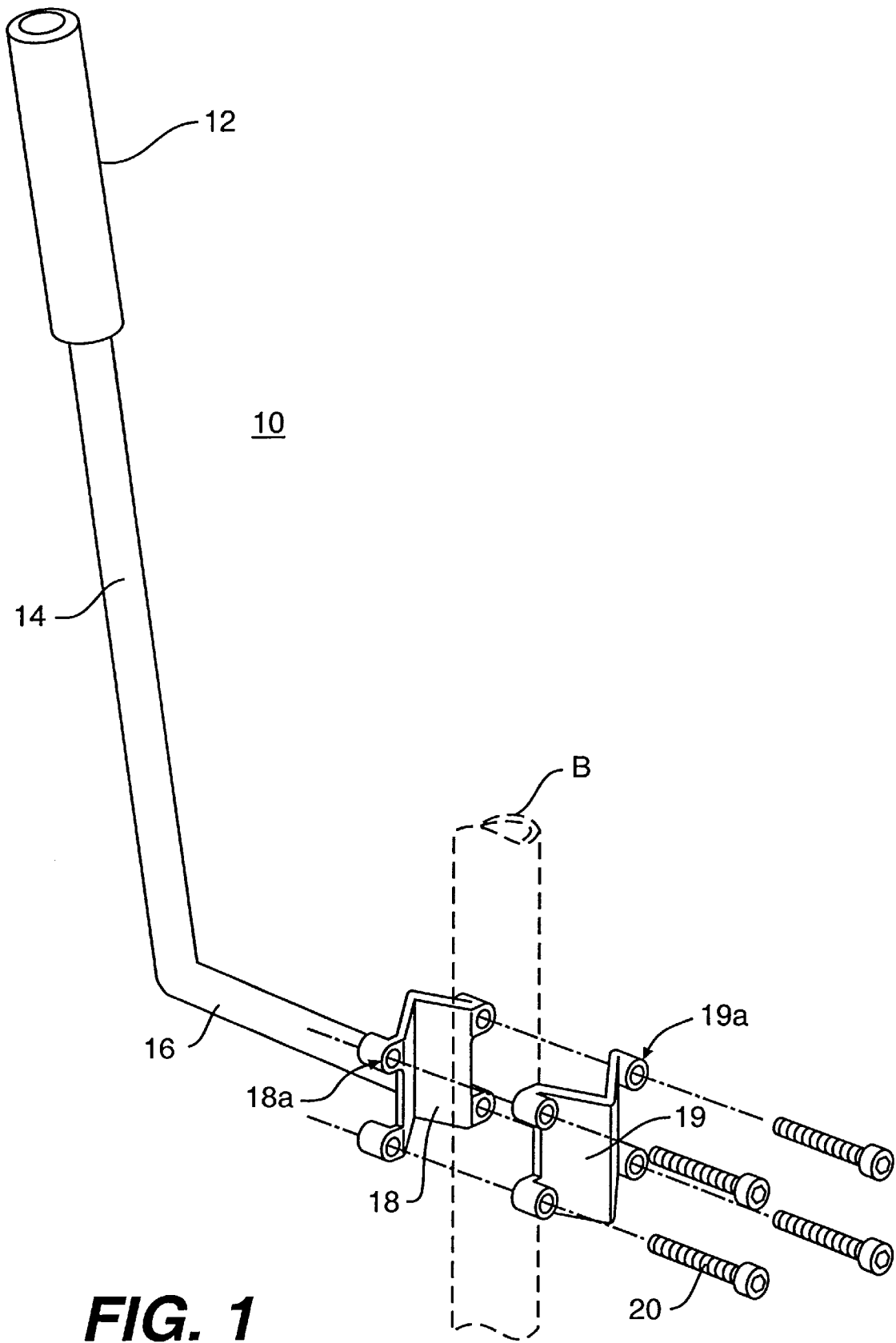
FIG. 1 is a perspective view of the training bar of the invention having an exploded section showing the clamping means.
Figure 4:
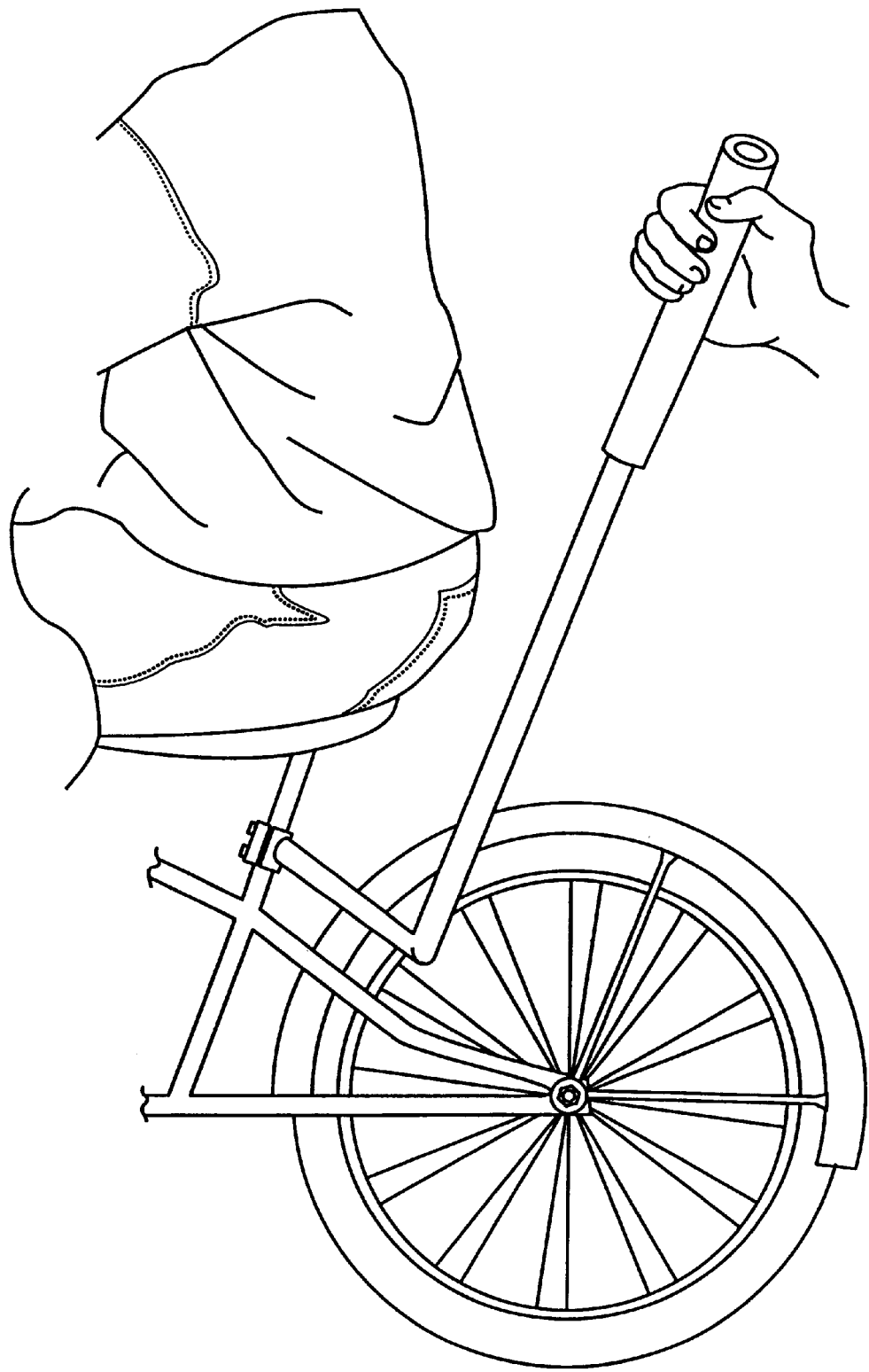
FIG. 4 is a perspective view of the training bar of the invention in operation (embodiment 1).

FIG. 1 shows the training device 10 of the invention, comprising an L-shaped bar having an upright portion 14 and a short portion 16 substantially perpendicular thereto. A handle grip 12 is provided at the control end of the upright portion 14, and clamping means 18, 19, 20 are provided at the clamping end of the short portion 16.

In this embodiment, clamping means 18, 19, 20 are arranged to attach the training device 10 to the bicycle seat support B by joining means 18 and 19 by screws 20 through holes 18a and 19a around the shaft of the seat support B to provide a strong and secure attachment of the training device to the bicycle seat support B. The point of attachment of the training device is preferably as close to the underside of the bicycle seat as possible in order to provide more control to the trainer over the movement of the bicycle and its rider.

Another factor in selecting the point of attachment is the height of the trainer. As illustrated, the handle grip 12 is provided on the upright portion 14 and formed so as to extend in an upright or substantially vertical position. In operation, the vertically positioned handle grip 12 should be placed in such a position that the trainer can easily grasp the grip 12 with the thumb or radial side of the hand held upward or substantially vertically. In the resulting arm position of the trainer, the elbow is at the trainer's side and not stretched or abducted.

Figure 5:
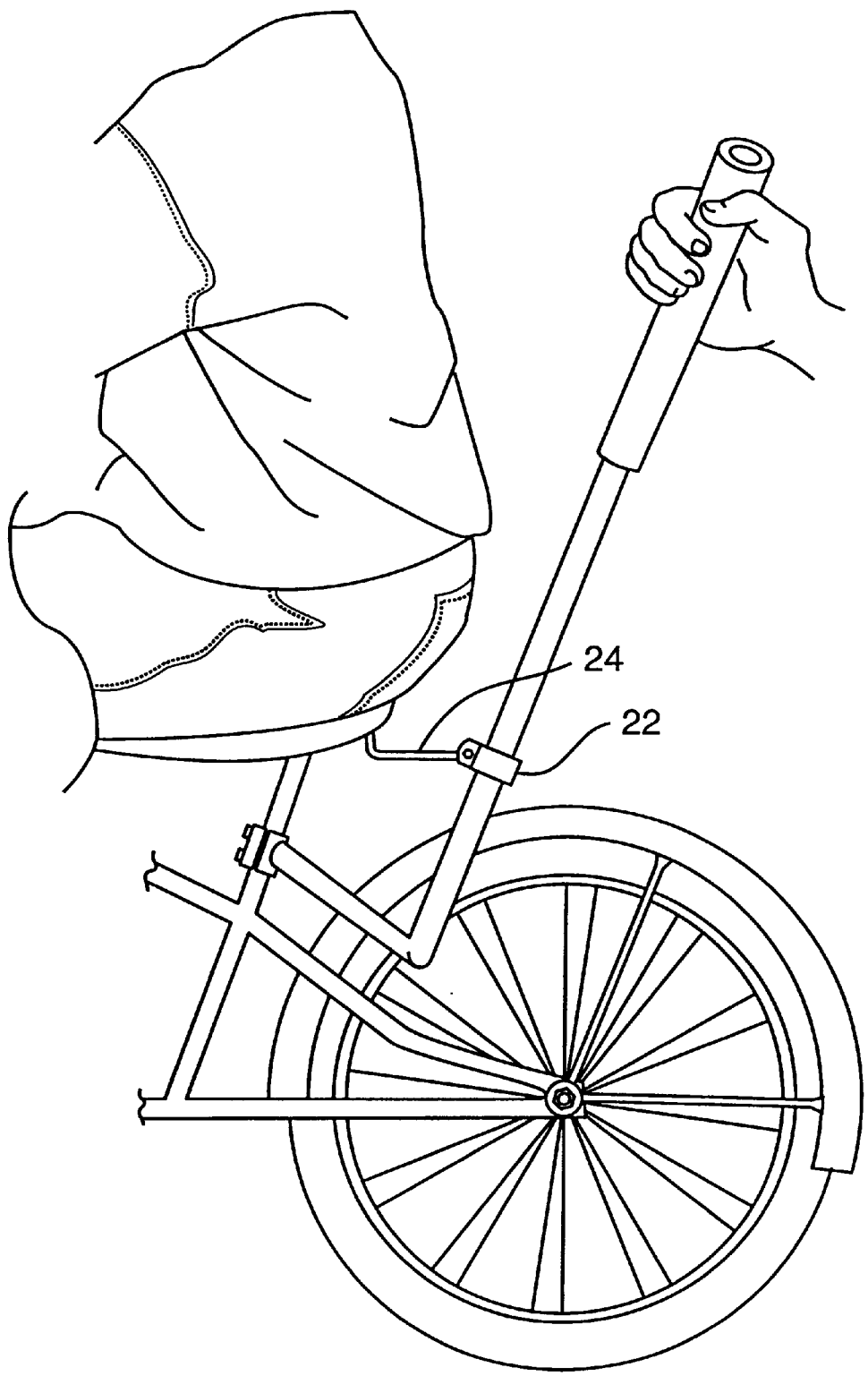
FIG. 5 is a perspective view of the training bar of the invention in operation (embodiment 2).

In a second embodiment of the invention, as shown in FIG. 5, a supplemental support member 24 is provided on the training device 10 by a further clamping means 22, and attaches to the seat of the bicycle. This embodiment of the invention provides improved control over the lateral movement of the bicycle and rider.

The L-shaped bar used in the device of the invention may be constructed of any strong, durable material used in the bicycle industry, including metal, fiberglass, plastics and the like. The handle grip may be constructed of conventional gripping material , such as polyurethane, leather, vinyl, cellulose, or the like. The clamping means may be of any conventional design which permits easy attachment to a bicycle as well as simple disassembly therefrom. This is also true for the supplemental support member of the second embodiment of the invention.

The upright portion of the L-shaped bar may be one solid piece, or may be a telescoping pole to permit use of the training device by trainers of different heights.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A bicycle having a device for training attached thereto comprising:

a bicycle frame supported by a front wheel and a rear wheel and having a longitudinal axis;

a seat supported by a single seat support tube extending upwardly from said bicycle frame;

a main support bar having at least an upright long portion with first and second ends;

a lower short portion having one end thereof unitarily formed on the first end of said upright long portion, the upright long portion and the lower short portion being connected substantially perpendicular to one another so as to form an L-shape;

a clamping means for fixedly clamping onto the single seat support tube of the bicycle, said clamping means being fixedly connected to said lower short portion at the end thereof not formed on the upright long portion, such that the upright long portion is substantially parallel to the seat tube; and a handle grip formed on said second end of said upright long portion, wherein said handle grip is positioned upright so as to receive a thumb or radial side of a hand of an operator in an upward direction, and wherein said device is fixedly clamped onto the seat support tube at an angular position relative to the longitudinal axis of the bicycle such that the operator's body including the hand engaging the handle grip is to one side of the bicycle.

2. A device according to claim 1 wherein the upright portion is comprised of a telescoping pole to permit length adjustment.

3. A device according to claim 1 which further comprises a second clamping means for clamping onto the seat of the bicycle.

4. A device according to claim 3 wherein the upright portion is comprised of a telescoping pole to permit length adjustment.

* * * * *